Oct. 30, 1951   E. J. VON PEIN   2,573,074
FISHING REEL
Filed Sept. 29, 1948   4 Sheets-Sheet 1
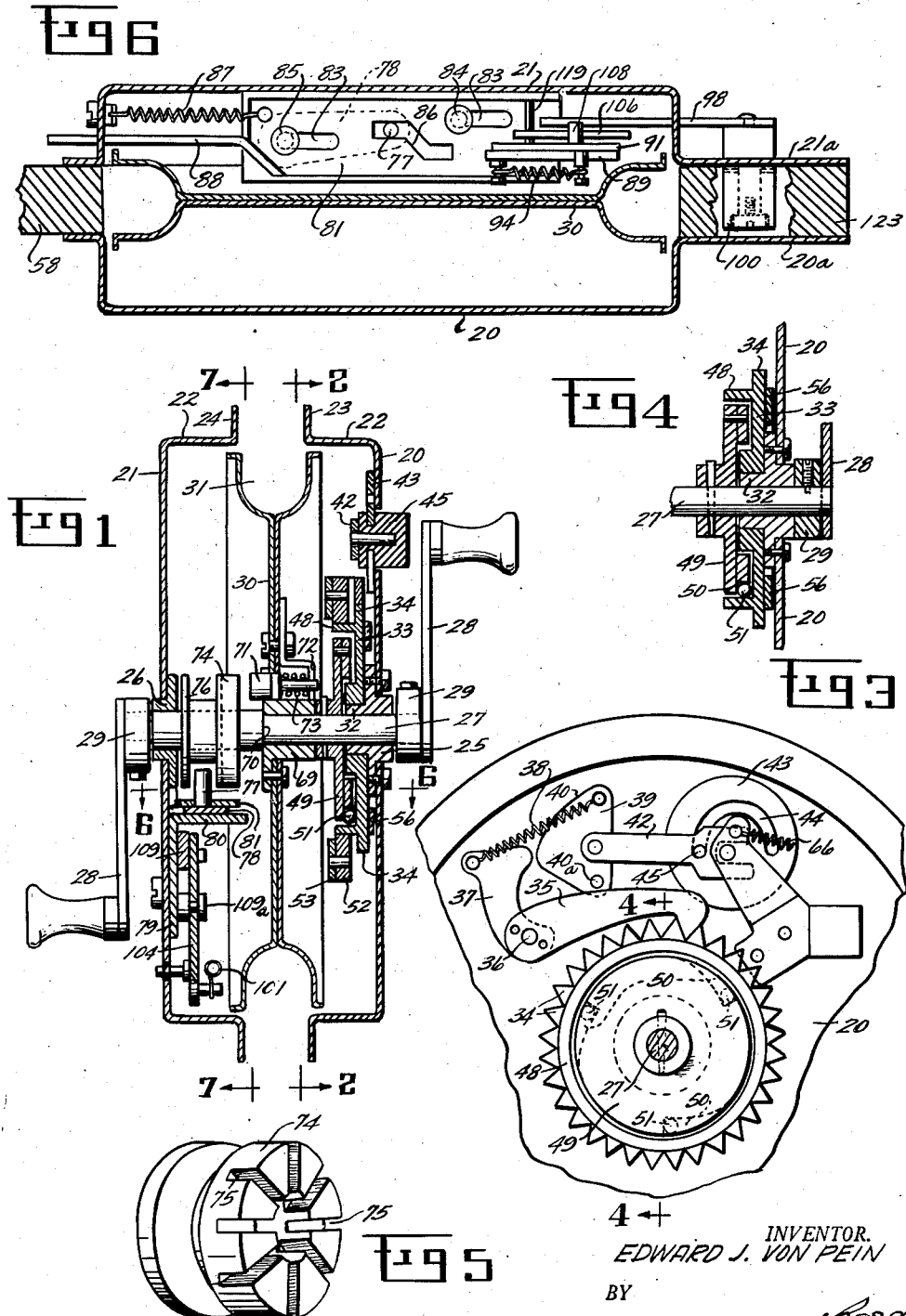
INVENTOR.
EDWARD J. VON PEIN
BY
—ATTORNEY—

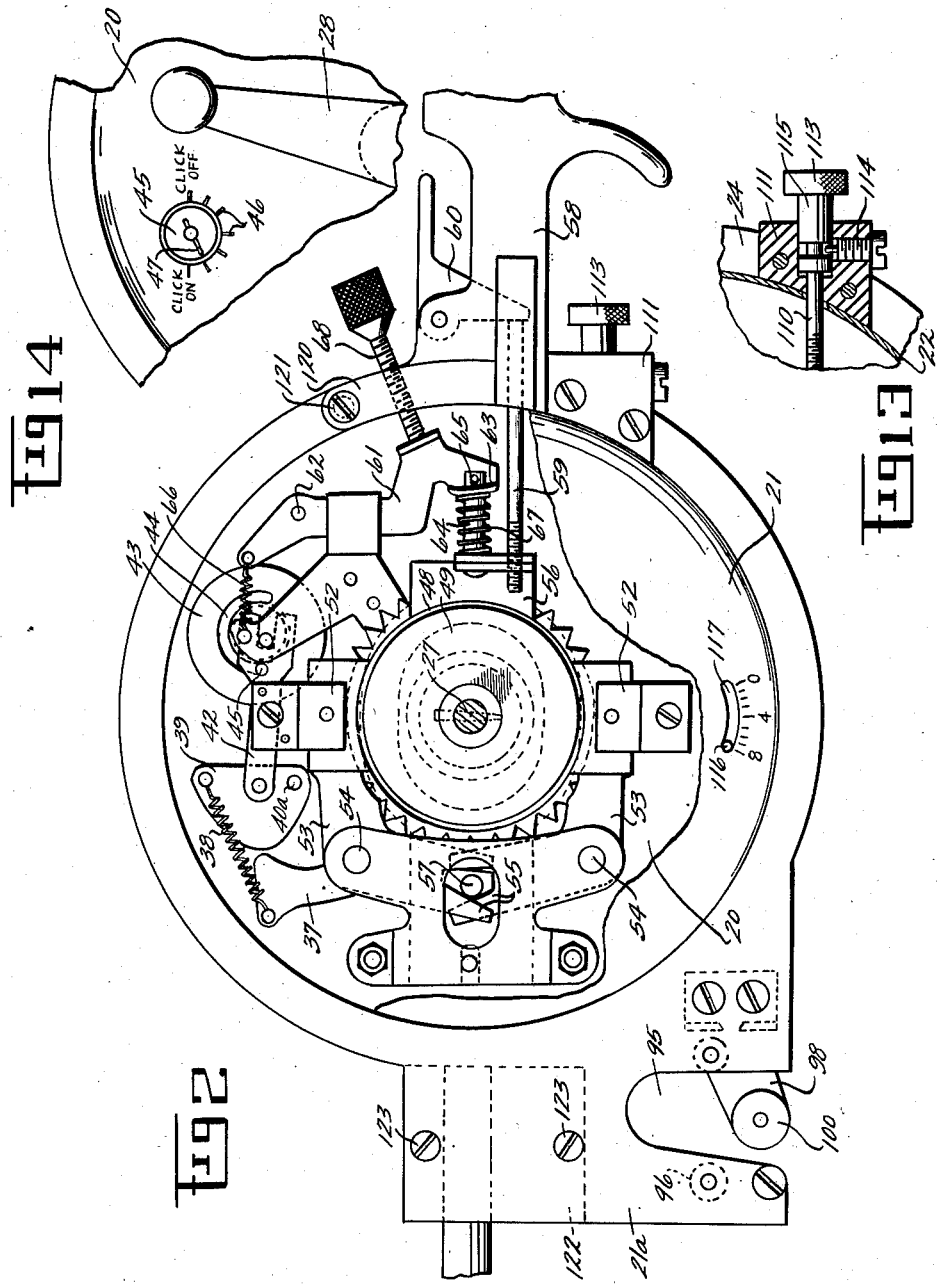

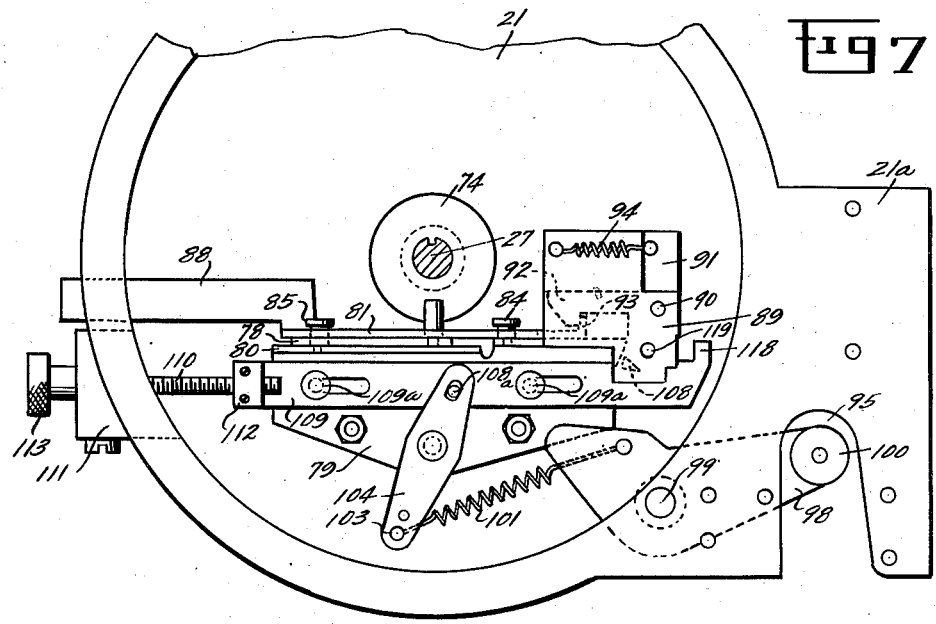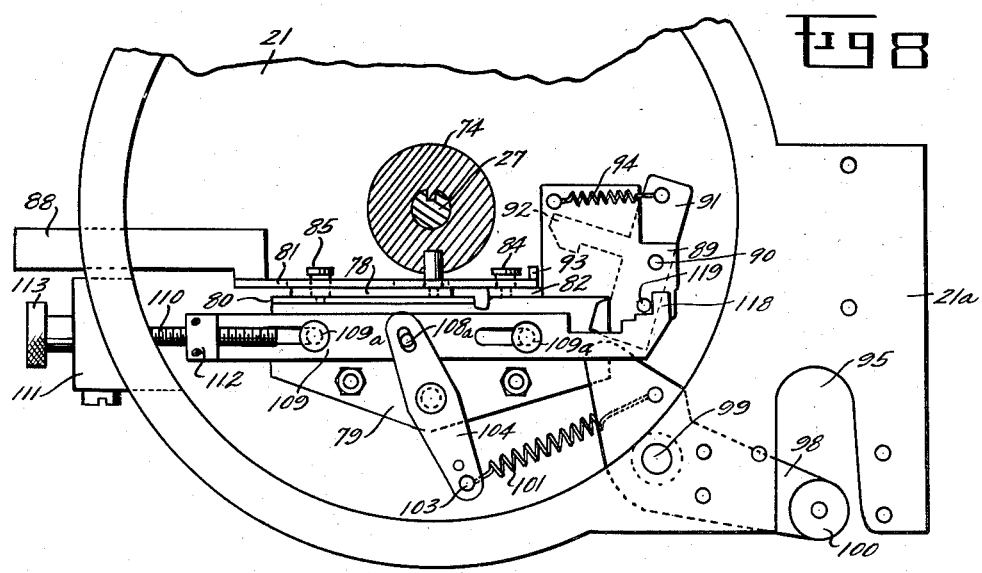

Oct. 30, 1951   E. J. VON PEIN   2,573,074
FISHING REEL
Filed Sept. 29, 1948   4 Sheets-Sheet 4
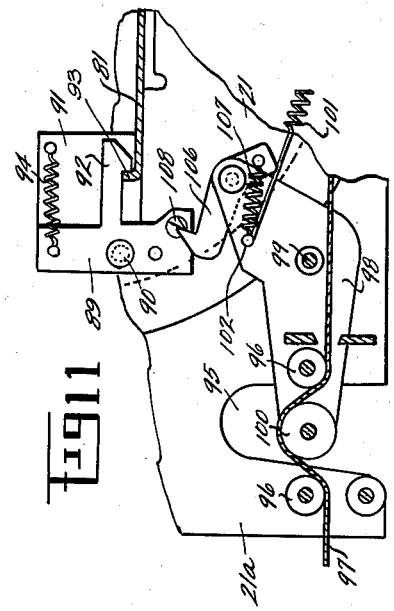
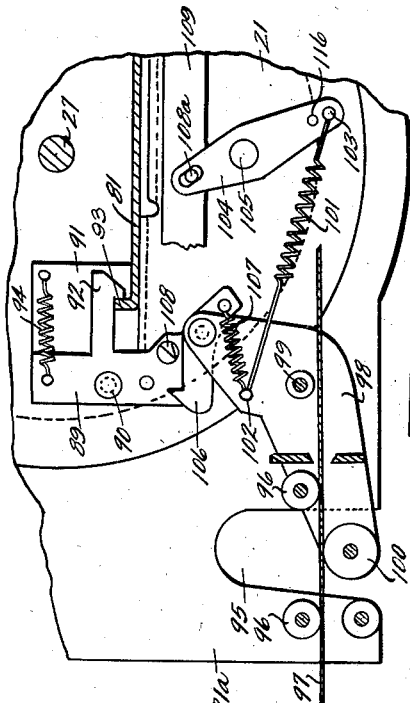
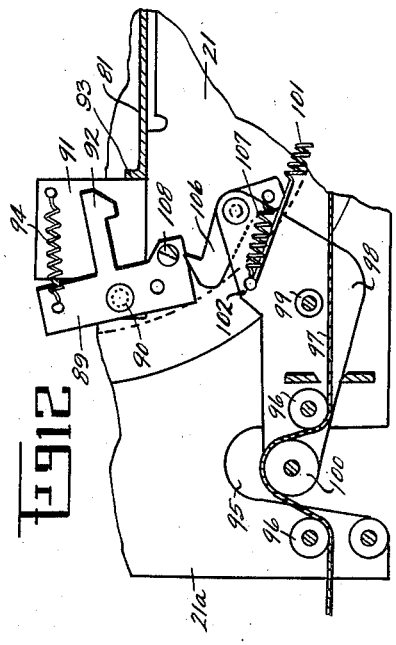
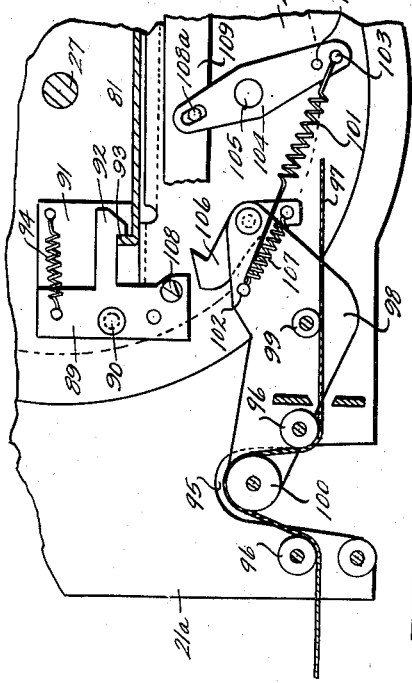
INVENTOR.
EDWARD J. VON PEIN
BY
ATTORNEY—

Patented Oct. 30, 1951

2,573,074

UNITED STATES PATENT OFFICE 2,573,074

FISHING REEL

Edward J. Von Pein, Dayton, Ohio

Application September 29, 1948, Serial No. 51,820

11 Claims. (Cl. 242—84.6)

This invention relates to a fishing reel, and one object of the invention is to provide a reel with improved means for preventing the overrunning of the spool at the end of the cast.

A further object of the invention is to provide a reel in which the rotation of the spool is automatically interrupted when the lure strikes the water.

A further object of the invention is to provide a reel in which the spool runs freely on its shaft during casting and which has means controlled by the tension on the line to connect the spool with the shaft at the end of the cast.

A further object of the invention is to provide a reel in which the shaft is held against rotation during casting and the means for connecting the spool with the shaft is positively retained in disconnecting position until the lure strikes the water and is then automatically released and actuated to connect the spool with the shaft.

A further object of the invention is to provide such a reel in which the tension controlled means is adjustable to accommodate the same to lines having different tensions at the beginning of the cast.

A further object of the invention is to provide a reel in which the restraint to the rotation of the spool by the line may be easily and accurately adjusted and maintained in accordance with the requirements of the service for which it is used.

A further object of the invention is to provide a spool having simple and easily operated means for connecting the spool with and disconnecting the same from the shaft and for releasably locking the spool to the shaft.

Other objects of the invention may appear as the reel is described in detail.

In the accompanying drawings Fig. 1 is a vertical section taken centrally through a reel embodying the invention; Fig. 2 is a section taken on the line 2—2 of Fig. 1 and omitting the spool; Fig. 3 is a side elevation of the combined brake, overrunning clutch and click; Fig. 4 is a section taken on the line 4—4 of Fig. 3; Fig. 5 is a perspective view of one of the clutch members for the spool; Fig. 6 is a section taken on the line 6—6 of Fig. 1 looking in the direction of the arrows and omitting the brake mechanism; Fig. 7 is a section taken on the line 7—7 of Fig. 1, omitting the spool and showing the clutch actuating mechanism in spool disconnecting position; Fig. 8 is a similar view showing the clutch actuating mechanism in spool connecting position; Figs. 9 to 12 are detail views showing the tension controlled mechanism in successive positions assumed thereby during a cast; Fig. 13 is a detail section of a part of the device for regulating the action of the line controlled mechanism; and Fig. 14 is a detail view showing the indicator of the click mechanism.

In these drawings I have illustrated one embodiment of the invention but it is to be understood that the reel as a whole, as well as the several parts thereof, may take various forms and may be assembled in various ways without departing from the spirit of the invention.

In the embodiment here illustrated the reel comprises a frame including laterally spaced side members 20 and 21 the marginal portions of which are offset inwardly as shown at 22 and then bent outwardly to form laterally spaced peripheral flanges 23 and 24. The frame members are provided with alined bearings 25 and 26 which are preferably formed separate from the frame members and rigidly secured thereto. Rotatably mounted in the bearings is a shaft 27 having handles 28 rigidly secured to the respective ends thereof, and also having secured thereto collars 29 arranged to hold the shaft against material axial movement with relation to the frame.

A spool 30 is rotatably mounted on the frame and is provided with a peripheral line receiving channel 31. Means are provided for connecting the spool with and disconnecting the same from the shaft 27. In the present instance the spool is mounted directly on the shaft and clutch mechanism is provided to connect the same with and disconnect the same from the shaft, as will be hereinafter described. Mounted about the shaft between the spool and the frame member 20 is a combined brake drum, overrunning clutch and click device. The bearing 25 is provided with an inwardly extending portion 32 having an exterior bearing surface on which is rotatably mounted a disk like member 33 having a circumferential series of peripheral teeth 34 which are preferably V-shaped and are adapted to cooperate with a spring pressed pawl 35 mounted on the frame member 20. The pawl is pivotally mounted on the frame member at 36 and is provided with an arm 37 connected by a spring 38 with a substantially triangular member 39 pivotally mounted on the frame member at 40—a and having a cam surface 40 opposed to the arm 37. The member 39 is actuated by a pitman 42 which in turn is actuated by a cam member 43 rotatably mounted on the frame member 20 and having a substantially semi-circular cam slot 44 to receive a pin 45 on the pitman. The cam member 43 is actuated by a knob 45 on the outer side of the frame member 20. The frame member is provided with graduations 46 and the knob has an indicator 47 movable over the indications to designate the position of the member 39 and thus indicate the tension of the spring 38. Thus the pressure on the pawl may be adjusted to regulate both the resistance which it offers to the rotation of the disk 33 and the sound produced thereby. This pawl controlling mechanism is substantially identical with that described in my pending application Serial Number 2,158, filed January 14, 1948, and need not be described in further detail.

The disk 33 is provided on that side thereof adjacent the spool with an annular flange 48 which constitutes a brake drum and is spaced inwardly from the ratchet teeth 34. Rigidly mounted on the shaft 27 between the disk 33 and the spool is a second disk 49 which constitutes one member of an overrunning clutch and extends into the brake drum 48, which also constitutes a second member of the overrunning clutch. Preferably the disk 49 is provided with a plurality, in the presence instance three, circumferentially tapered peripheral recesses 50 in each of which is arranged a ball 51 of such diameter that when in the deeper end of the recesses 50 it will be out of contact with either the brake drum or the base of the recess and will not restrict the relative rotation of the clutch members, but when moved into the shallow portion of the recess will lock the two clutch members one to the other. The inclined recesses 50 are so arranged that when the shaft and clutch member 49 are rotated in a direction to wind the line onto the spool 30 the balls will be in the deeper ends of the recesses and the overrunning clutch will offer no resistance to the rotation of the spool. When the clutch member 49 is rotated in a direction to pay out the line, that is clockwise in Fig. 3, the balls will be gripped between the inclined bases of the recesses and the member 48 to lock the two clutch members one to the other and thus place the rotation of the spool under the control of the brake mechanism.

The brake mechanism which cooperates with the brake drum 48 may take various forms but it is preferably provided with means whereby the action of the brake may be manually controlled or the mechanism may be set to provide a selected and continuing resistance to the rotation of the spool. As here shown it is substantially identical with mechanism shown in the above mentioned application Serial Number 2,158. Preferably the mechanism comprises brake shoes 52 arranged on opposite sides of the brake drum 48 and mounted on bell cranks 53 pivotally mounted on the frame member 20 at 54 and having their adjacent ends overlapping and provided with opposed notches as shown at 55. An actuating bar 56 is slidably mounted for movement in a substantially horizontal plane and is provided with a stud 57 which extends through the notches in the parts 55 of the shoe supporting arms so that those arms may be actuated by the reciprocatory movement of the bar 56 to move the shoes into or out of braking engagement with the brake drum. Connected with that end of the bar adjacent the handle 58 is a rod 59 which extends through the offset portion of the frame member 20 and has its outer end arranged to be engaged and actuated by a thumb lever 60 mounted on the handle. A lever 61 is mounted on the frame member 20 at 62 and is provided at one end with an apertured lip 63 through which extends a stud 64 one end portion of which is secured to the bar 56 and the other end portion of which is provided on the outer side of the lip 63 with a stop 65 to prevent its withdrawal from the lip. A spring 66 connected with the upper end of the lever 61 tends to move the lever counterclockwise and thus engage the lip 63 with the stop 65 and move the brake actuating bar 56 in a direction to withdraw the brake shoes. A spring 67 is confined between the end portion of the slide bar 56 and the lip 63 of the lever 61, and a screw 68 threaded into the frame member 20 engages the lever 61 to move the lower portion thereof inwardly and thus compress the spring 64 and that spring tends to move the brake shoes toward the drum. Thus by adjusting the screw 68 the brake shoes may be set and maintained in positions to exert any desired pressure on the brake drum, and by manipulating the thumb lever 60 the brake action may be at any time increased, either when the spring 67 is under compression or when it is free.

The spool 30 is provided with a hub 69 which is rotatably mounted on the shaft 27 and is confined between the hub portion of the clutch disk 49 and a shoulder 70 upon the shaft. Any suitable clutch mechanism may be provided for connecting the spool with and disconnecting the same from the shaft. In the arrangement shown a plunger type clutch member 71 is slidably mounted in the hub 69 and is provided with a stem slidably mounted in a bracket 72 secured to the spool, and a spring 73 urges the clutch member 71 to its outer or operative position. A second clutch member 74 is slidably mounted on the shaft and held against rotation with relation thereto and is provided in its inner face with a series of slots 75 adapted to receive the clutch member 71 when the clutch member 74 is moved toward the latter. When the clutch member 74 is moved toward the spool the clutch member 71 will enter one of the slots 75, if that slot is in line therewith, and thus engage the two clutch members to connect the spool with the shaft. If the clutch member 71 is engaged by the face of the clutch member 74 between two slots the clutch member 71 will move against the action of the spring 73 to permit the clutch member 74 to complete its movement and the relative rotation of the shaft and the spool will bring the clutch member 71 in line with one of the slots 75 and the spring 73 will force the same into that slot, thereby positively clutching the spool to the shaft.

The clutch member 74 may be actuated in any suitable manner and in the present instance is provided with a circumferential groove 76 to receive an actuating member, here shown as a stud 77, rigidly mounted on the free end of a lever 78 which is pivotally mounted at its other end on a bracket secured to the frame member 21. In the arrangement shown this bracket comprises a base member 79 rigidly secured to the inner side of the frame member 21 having its upper end turned inwardly to provide a flange or shelf 80 on which the lever 78 rests. The clutch actuating stud 77 extends upwardly through a cam plate 81 one end portion of which rests on the lever 78 and the other end portion of which rests on a flange or shelf 82 on the bracket 79 which is raised above the shelf 80 a distance approximating the thickness of the lever 78. The plate 81 is provided with longitudinal slots 83 and is connected with the bracket by headed studs 84 and 85 extending through the respective slots, the studs 84 being threaded into the shelf 82, and the stud 85 extending through both the plate 81 and the lever 78 and being threaded into the shelf 80. Thus the stud 85 serves both as a guide for the cam plate and as a pivot pin for the lever 78. The cam plate is provided with a cam slot 86 through which the actuating stud 77 extends. The end portions of the cam slot 86 are offset laterally one from the other, are parallel with the guide slots 83 and are connected by an oblique portion of the slot. When the cam plate 81 is moved to the right, as viewed in Fig. 6, the stud 77 is actuated thereby to move the clutch member 74 to the left, as viewed in Fig. 1, and thus declutch the spool and permit its free rotation on the shaft. When the cam plate is moved to the left, as viewed in Fig. 6, the stud 77 is actuated thereby to move the clutch member 74 into engagement with the clutch member 71 and thus clutch the spool to the shaft. A spring 87 connected with the cam plate 81 and with the frame member 21 serves to move the cam plate in a direction to clutch the spool to the shaft and the cam plate is provided with an actuating member or bar 88 which extends through an opening in the offset portion of the frame member 21 and projects beyond the latter to form an actuating device by which the cam plate may be moved to the right to declutch the spool from the shaft. Releasable means are provided for retaining the cam plate in declutching position and in the present construction a pawl 89 is pivotally mounted at 90 on an upwardly extending part 91 of the bracket 79 and is provided with a nose 92 to engage an upwardly extending part, such as a lip 93, on the cam plate 81. A spring 94 retains the pawl normally in operative position and the nose is beveled to permit the lip on the cam plate to be moved beneath the nose and then engaged thereby. When the cam plate is so engaged by the pawl the clutch member 74 is retained in declutching position until the pawl is actuated to release the same and permit it to be moved to clutching position by the spring 87.

The movement of the pawl 89 to an inoperative position to release the cam plate is controlled by the line which leads from the spool. In making a cast a weight on the free end portion of the line, herein referred to as the lure, carries the line forward and the line is under its greatest tension during the initial movement of the lure. This tension decreases as the lure moves outwardly and is substantially eliminated when the lure strikes the water, and this varying tension of the line is utilized to release the cam plate at the instant the lure strikes the water and thus permit the cam plate to be actuated by its spring to quickly clutch the spool to the shaft and thereby place the spool under the control of the retarding device or devices, such as the click and the brake mechanism. For this purpost there is employed a line controlled mechanism the preferred form of which is shown in Figs. 9 to 12. The frame members 20 and 21 are provided with forwardly extending portions 20a and 21a which are provided in their lower portions with slots 95 opening through the lower edges thereof. Each frame extension is provided on opposite sides of its slot with line guides, such as rollers 96, and the line, 97, leads from the spool across the slots 95 in contact with the guides. Movably mounted on one or both frame members and preferably between the extensions 20a and 21a is a line engaging device which preferably comprises a lever 98 substantially in the form of a bell crank and pivotally mounted on the extension 21a adjacent its angle, as shown at 99. The forward end of this line engaging member extends partially across the slots 95 and is provided with a roller 100 or the like which extends below and engages that portion of the line which extends across the slots. Spring means are provided to urge the part 100 of the line engaging member upwardly. In the present instance a spring 101 is connected at one end with a stud 102 on that end portion of the lever opposite the line engaging part 100, and at its other end is connected with a normally fixed part such as a stud 103 on one end of a lever 104 which is pivotally mounted on the frame member at 105, for a purpose which will hereinafter appear, but which is normally held against movement. When the line is slack, preceding a cast, the spring 101 retains the lever in the position shown in Fig. 9 with the line engaging part thereof in the upper portion of the slot 95 and with a portion of the line looped about the same. When a cast is made the line is quickly drawn taut and the initial tension thereon is sufficient to move the line engaging part 100 of the lever against the action of the spring 101 to a position in which the line is straight or substantially straight, as in Fig. 10. This movement of the lever carries the upper end thereof upwardly and forwardly and the nose of a pawl 106, pivotally mounted on the upper end of the lever and urged about its axis in a clockwise direction by a spring 107, engages a stud 108 on the lower portion of the pawl 89 and is depressed thereby until it has moved forwardly past the stud and then snaps upwardly. As the tension on the line decreases the spring 101 moves the lever 98 toward its normal position, as shown in Fig. 11, and moves the pawl 106 into engagement with the stud 108 on the pawl 89. Substantially at the instant the lure strikes the water, and the line becomes slack, the spring 101 causes the pawl 106 to move the pawl 89 about its pivotal axis, as shown in Fig. 12, thus releasing the cam plate 81, which is then quickly moved by its spring to clutching position. Thus the retarding device or devices become effective substantially at the instant the lure strikes the water and the rotation of the spool is retarded or completely interrupted so as to prevent over-running thereof.

Means are also provided for regulating the tension of the spring means acting on the lever 98 to adapt the same to lines having different initial tensions, due to the weight of the line or the weight of the lure, or the like. For this purpose the spring 101 is connected with one end of the lever 104 as above described and the other end of that lever is connected by a pin and slot connection 108a with an adjusting bar 109 which extends transversely to the pivotal axis of the lever 104 and is connected with the bracket 79 by headed studs 109a extending through guide slots in the bar. Thus the longitudinal adjustment of the bar 109 moves the lever 104 about its pivotal axis and increases or decreases the tension of the spring 101 according to the direction in which the lever 104 is moved. This adjustment may be effected in any suitable manner and in the present instance an adjusting screw 110 is rotatably mounted in a block 111 secured to the peripheral portion of one of the frame members adjacent the handle 58 and has its inner portion threaded into a lug 112 on the adjacent end of the adjusting bar 109. The screw is provided at its outer end with an actuating knob 113 and is held against axial movement, as by a screw 114 having a part extending into a circumferential groove in an elongated hub 115 forming a part of the knob 113. By rotating the screw the tension on the spring 101 may be adjusted as desired and that adjustment will be maintained until the screw is again manually operated. A pin 116 connected with the lever 104 extends through a slot 117 in the adjacent frame member, as shown in Fig. 2, and numbered graduations are arranged along the slot to indicate by the position of the pin 116 with relation to the slot the tension of the spring 101. The bar 109 is provided at that end opposite the screw with a projection or lug 118 adapted to engage a pin 119 on the lower portion of the pawl 89 and thus move that pawl to and retain the same in its inoperative position. By actuating the screw 110 to move the adjusting bar 109 to the left in Figs. 7 and 8 the lug 118 may be caused to engage the pin 119 and lock the pawl 89 in its inoperative position when the reel is being used for purposes other than casting.

The reel is connected with the handle and the rod, or tip, in much the same manner as shown in my pending application Serial Number 736,381, filed March 21, 1947 now abandoned. Preferably the handle 58 is provided with an arcuate portion 120 which is arranged between and rigidly secured to the flanges 23 and 24 of the frame members, as by means of screws, one of which is shown at 121. A rod chuck 122 is arranged between the upper portions of the extensions 20a and 21a and removably connected therewith as by screws 123.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a fishing reel, a frame, a line supporting spool rotatably mounted on said frame, a device for rotating said spool, means for connecting said spool with said rotating device and for disconnecting the same therefrom for free rotation when casting, means controlled by said line for actuating said connecting means to connect said spool with said rotating device substantially at the end of the cast, and means for locking said line controlled means in an inoperative position when said spool is connected with said rotating device.

2. In a fishing reel, a frame, a line supporting spool rotatably supported on said frame, a device for rotating said spool, means including an actuating member for connecting said spool with and disconnecting the same from said rotating device, means for moving said actuating member to spool disconnecting position prior to casting, a line engaging device, a lever movable about a fixed axis, a spring connected with said lever and with said line engaging device to impart movement to the latter as the tension on the line decreases during a cast, means controlled by said line engaging device to move said actuating member to spool connecting position when a lure on said line strikes the water, an adjustable member connected with said lever to control the tension of said spring, and means operable from the exterior of said frame to adjust said adjustable member.

3. In a fishing reel, a frame, a line supporting spool rotatably supported on said frame, a device for rotating said spool, means including an actuating member for connecting said spool with and disconnecting the same from said rotating device, means for moving said actuating member to spool disconnecting position prior to casting, a line engaging device, spring means for moving said line engaging device as the tension on the line decreases during the cast, means controlled by said line engaging device to move said actuating member to spool connecting position when a lure on the line strikes the water, means to adjust said spring means to modify the action thereof on said line engaging device, and means arranged exteriorly of said frame for indicating the position to which said spring means has been adjusted.

4. In a fishing reel, a frame, a line supporting spool rotatably supported on said frame, a device for rotating said spool, means including an actuating member for connecting said spool with and disconnecting the same from said rotating device, a detent to retain said actuating member in spool disconnecting position, a line engaging device, spring means for moving said line engaging device as the tension on said line decreases during a cast, and means controlled by said line engaging device to release said actuating member from said detent and to move said actuating member to spool connecting position when a lure on said line strikes the water.

5. In a fishing reel, a frame, a line supporting spool rotatably supported on said frame, a device for rotating said spool, means including an actuating member for connecting said spool with and disconnecting the same from said rotating device, spring means to move said actuating member to spool connecting position, means for moving said actuating member to spool disconnecting position prior to casting, a detent to retain said actuating member in said disconnecting position, a line engaging member movable from its normal position by the initial tension on said line when the cast is made, spring means for returning said line engaging member to said normal position when a lure on said line strikes the water, and means carried by said line engaging member and operable upon the return movement thereof to release said actuating member from said detent.

6. In a fishing reel, a frame, a shaft rotatably mounted on said frame, a line supporting spool rotatably mounted on said shaft, a clutch for connecting said spool with and for disconnecting the same from said shaft and including a member connected with said shaft for rotation therewith and for movement lengthwise thereof, a member for actuating said clutch member, a second member for operating said actuating member, spring means for moving said second member in a direction to move said clutch member to clutching position, manually operable means for moving said second member in a direction to move said clutch member to declutching position, a detent to engage said second member and retain said clutch member in declutching position, and means controlled by the tension on said line for disconnecting said detent and releasing said second member for movement by said spring means.

7. In a fishing reel, a frame, a shaft rotatably mounted on said frame, a line supporting spool rotatably mounted on said shaft, a clutch for connecting said spool with and for disconnecting the same from said shaft and including a member connected with said shaft for rotation therewith and for movement lengthwise thereof, a member for actuating said clutch member, a second member for operating said actuating member, spring means for moving said second member in a direction to move said clutch member to clutching position, manually operable means for moving said second member in a direction to move said clutch member to declutching position, a detent to engage said second member and retain said clutch member in declutching position, means controlled by the tension on said line for disconnecting said detent and releasing said second member for movement by said spring means, and a retarding device connected with said shaft to check the rotation of said spool in line unwinding direction when said spool has been clutched to said shaft.

8. In a fishing reel, a frame, a shaft rotatably mounted on said frame, a line supporting spool rotatably mounted on said shaft, a clutch for connecting said spool with and for disconnecting the same from said shaft and including a member connected with said shaft for rotation therewith and for movement lengthwise thereof, a member for actuating said clutch member, a second member for operating said actuating member, spring means for moving said second member in a direction to move said clutch member to clutching position, manually operable means for moving said second member in a direction to move said clutch member to declutching position, a detent to engage said second member and retain said clutch member in declutching position, a lever on said frame having a line engaging part and movable in one direction about its pivotal axis by said line when said line is drawn taut, spring means for moving said lever in the other direction when said line is slack, means carried by said lever and operable upon the last mentioned movement thereof to disengage said detent from said second member and release the latter for movement by the first mentioned spring means, and means operable upon the clutching of said spool to said shaft to interrupt the rotation of said spool.

9. In a fishing reel, a frame, a shaft rotatably mounted on said frame, a line supporting spool rotatably mounted on said shaft, a clutch for connecting said spool with and for disconnecting the same from said shaft and including a member connected with said shaft for rotation therewith and for movement lengthwise thereof, a member for actuating said clutch member, a second member for operating said actuating member, spring means for moving said second member in a direction to move said clutch member to clutching position, manually operable means for moving said second member in a direction to move said clutch member to declutching position, a detent to engage said second member and retain said clutch member in declutching position, spaced line guides on said frame, a lever pivotally mounted between its ends on said frame and having adjacent one end thereof a part to engage the line between said guides and move said lever in one direction about its pivotal axis when said line is drawn taut, spring means connected with said lever adjacent the other end thereof and with a normally fixed part on said frame to move said lever in the other direction when said line becomes slack, a part carried by the last mentioned end of said lever to disengage said detent from said second member when said lever is moved in the last mentioned direction and thereby release said second member for movement by the first mentioned spring means, and means operative upon the clutching of said spool to said shaft to interrupt the rotation of said spool.

10. In a fishing reel, a frame, a shaft rotatably mounted on said frame, a line supporting spool rotatably mounted on said shaft, a clutch for connecting said spool with and for disconnecting the same from said shaft and including a member connected with said shaft for rotation therewith and for movement lengthwise thereof, a member for actuating said clutch member, a second member for operating said actuating member, spring means for moving said second member in a direction to move said clutch member to clutching position, manually operable means for moving said second member in a direction to move said clutch member to declutching position, a detent to engage said second member and retain said clutch member in declutching position, spaced line guides on said frame, a lever pivotally mounted between its ends on said frame and having adjacent one end thereof a part to engage the line between said guides and move said lever in one direction about its pivotal axis when said line is drawn taut, a spring connected with said lever adjacent the other end thereof and with a normally fixed part on said frame to move said lever in the other direction when said line becomes slack, means for adjusting said part to modify the action of said spring on said lever, a part carried by the last mentioned end of said lever to disengage said detent from said second member when said lever is moved in the last mentioned direction and thereby release said second member for movement by the first mentioned spring means, and means operative upon the clutching of said spool to said shaft to interrupt the rotation of said spool.

11. In a fishing reel, a frame, a shaft rotatably mounted on said frame, a line supporting spool rotatably mounted on said shaft, a clutch for connecting said spool with and disconnecting the same from said shaft and including a member connected with said shaft for rotation therewith and for movement lengthwise thereof, a member for actuating said clutch member, a plate slidably mounted on said frame and having a cam slot through which said actuating member extends, spring means for moving said plate in clutch engaging direction, means operable from the exterior of said frame for moving said plate in clutch disengaging direction, said plate also having a projecting part, a pawl pivotally mounted on said frame to engage said projecting part and retain said plate in clutch disengaging position, said pawl having a lateral projection below its pivotal axis, a lever pivotally mounted between its ends on said frame and having on its forward end a line engaging part to move said lever in one direction about its pivotal axis when said line is drawn taut, spring means to move said lever in the other direction about said axis when said line becomes slack, said lever having an upwardly extending rear portion, a spring actuated pawl mounted on said rear portion of said lever and adapted to engage the projection on the first mentioned pawl and disengage the latter from said plate when said lever moves in the last mentioned direction and thereby release said plate for movement by its spring in clutch engaging direction, and a retarding device connected with said shaft to interrupt the rotation of said spool when the latter has been clutched to said shaft.

EDWARD J. VON PEIN.

REFERENCES CITED

The following references are of record in the file of this patent:

UNITED STATES PATENTS

| Number | Name | Date |
| --- | --- | --- |
| 2,179,972 | Adams | Nov. 14, 1939 |
| 2,268,463 | Schafer | Dec. 30, 1941 |
| 2,331,249 | Treadway | Oct. 5, 1943 |
| 2,470,507 | Luton et al. | May 17, 1949 |
| 2,492,819 | Schulz | Dec. 27, 1949 |